United States Patent [19]

Mueller

[11] Patent Number: 4,585,592
[45] Date of Patent: Apr. 29, 1986

[54] REDUCING THE CONTENT OF OLIGOMERIC CYCLIC ETHERS IN POLYOXYBUTYLENE POLYOXYALKYLENE GLYCOLS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 706,472

[22] Filed: Feb. 28, 1985

[51] Int. Cl.$^4$ .......................... C09F 5/08; C11C 3/00; C07C 43/11
[52] U.S. Cl. .................................. 260/408; 260/410.5; 260/410.6; 568/617; 568/607; 568/614; 568/621; 560/240
[58] Field of Search ............... 568/617, 607, 614, 621; 560/220, 240, 263; 260/410, 410.6, 408, 410.5

[56] References Cited

U.S. PATENT DOCUMENTS 4,127,513 11/1978 Bellis .
4,228,272 10/1980 Del Pesco .
4,251,654 2/1981 Robinson et al. ................... 568/617

FOREIGN PATENT DOCUMENTS 6107 11/1983 European Pat. Off. .
854958 11/1960 United Kingdom .

Primary Examiner—Howard T. Mars
Attorney, Agent, or Firm—John H. Shurtleff

[57] ABSTRACT

In polyoxybutylene polyoxyalkylene glycols obtained by copolymerization of tetrahydrofuran with a 1,2-alkylene oxide in the presence of a compound containing reactive hydrogen and under the catalytic action of a bleaching earth, the content of oligomeric cyclic ethers is reduced by distillation under reduced pressure at above 200° C. after first treating the copolymer with oxygen or an oxygen-containing gas (air) at a temperature of from 20° to 110° C.

7 Claims, No Drawings

REDUCING THE CONTENT OF OLIGOMERIC CYCLIC ETHERS IN POLYOXYBUTYLENE POLYOXYALKYLENE GLYCOLS

The present invention relates to a process for reducing the content of oligomeric cyclic ethers in copolymers of tetrahydrofuran and alkylene oxides.

British Pat. No. 854,958 describes a process for the copolymerization of tetrahydrofuran and 1,2-alkylene oxides, the process being carried out in the presence of compounds containing reactive hydrogen and under the catalytic action of bleaching earths. The main disadvantage of this process is that relatively large amounts of low molecular weight products are inevitably produced. The copolymer can contain from 10 to 18% by weight of the undesirable by-products, which predominantly consist of oligomeric cyclic ethers (cf. U.S. Pat. No. 4,127,513, column 1, lines 25 to 26, and European Pat. No. 6,107, page 2, lines 7 to 12). The contamination of these copolymers by these oligomeric cyclic ethers is undesirable for many reasons. Since the impurities are inert materials, and the copolymers are mainly used for the preparation of polyurethanes, these inert materials have an adverse effect on, for example, the mechanical properties of the finished products. The oligomers may furthermore be exuded at the surface of the finished products or be dissolved out by solvents, with the result that, for example, the dimensional stability of the finished products is adversely affected.

There has therefore been no lack of attempts to reduce the content of oligomeric cyclic ethers in copolymers of tetrahydrofuran and alkylene oxides. For example, U.S. Pat. No. 4,127,513 proposes the use of a specially activated montmorillonite as a selective catalyst for the polymerization, this being obtained by activating the bleaching earth with relatively highly concentrated acids. The disadvantages of this process are that the resulting polymers have high color numbers, the polymerization rate is relatively low, and the copolymers formed still contain from 5 to 6% by weight of oligomeric cyclic ethers. According to U.S. Pat. No. 4,228,272, the catalyst used for the copolymerization of alkylene oxides with tetrahydrofuran is a bleaching earth which has a certain specific pore volume, a defined catalyst surface area and a defined pore diameter. This process is said to give products having an improved color number, at a higher polymerization rate. However, these copolymers too contain, for example, 4% by weight of oligomeric cyclic ethers (cf. column 5, lines 14 and 15). This oligomer content is still too high for the polymers to be used for the preparation of polyurethanes which have to meet fairly high mechanical requirements.

European Pat. No. 6,107 describes a process for reducing the content of oligomeric cyclic ethers in copolymers of tetrahydrofuran and alkylene oxides. In this method, the cyclic ethers are depolymerized with the aid of an acid-activated bleaching earth. In this procedure, the cyclic ethers are converted to tetrahydrofuran, water and various by-products. In this process, there is the danger that the open-chain glycols, ie. the desired alkylene oxide copolymers, will also be depolymerized as soon as the temperatures selected are too high or the reaction times chosen too long. This is the case whenever it is desired to remove oligomeric cyclic ethers as completely as possible. Losses of yield and the formation of colored polymers may then result.

We have found that the content of oligomeric cyclic ethers in polyoxybutylene polyoxyalkylene glycols can be reduced in a particularly effective manner if copolymers obtained by copolymerization of tetrahydrofuran with a 1,2-alkylene oxide in the presence of a compound containing reactive hydrogen, under the catalytic action of a bleaching earth, are subjected to distillation under reduced pressure at above 200° C.

In the novel process, the content of oligomeric cyclic ethers is reduced in polyoxybutylene polyoxyalkylene glycols which are obtainable in a conventional manner by copolymerization of tetrahydrofuran with a 1,2-alkylene oxide in the presence of a compound containing reactive hydrogen and of a bleaching earth. These copolymers are prepared using, as 1,2-alkylene oxides, unsubstituted or substituted alkylene oxides which can contain, for example, linear or branched alkylene of 1 to 6, preferably 1 or 2, carbon atoms, phenyl which is unsubstituted or substituted by alkyl and/or alkoxy of 1 or 2 carbon atoms or by halogen, or halogen, preferably chlorine, as substituents. Examples include 1,2-butylene oxide, 2,3-butylene oxide, styrene oxide, epichlorohydrin and, preferably, ethylene oxide and 1,2-propylene oxide. The 1,2-alkylene oxides can be used individually or in the form of mixtures, for example a mixture of ethylene oxide and 1,2-propylene oxide.

Examples of compounds containing reactive hydrogen are water, monohydric and polyhydric alcohols, such as methanol, ethanol, propanol, ethylene glycol, butylene glycol, glycerol, neopentylglycol and butanediol, and, in particular, carboxylic acids of, for example, 1 to 8 carbon atoms, especially formic acid, acetic acid and propionic acid.

The bleaching earths used as catalysts in the copolymerization are described in, for example, Ullmann's Enzyklopadie der technischen Chemie, 3rd edition, Vol.IV, pages 541–545. These are natural or synthetic bleaching earths, such as aluminum hydrosilicates or aluminum magnesium hydrosilicates of the montmorillonite type, which can be activated by an acid and are obtainable commercially, for example under the name ®Tonsil. Synthetic bleaching earths are described in, for example, British Pat. No. 854,958.

Copolymerization is carried out, for example, in a fixed catalyst bed at from 0° to 50° C., preferably from 20° to 45° C., and under atmospheric pressure. Polymerization using a catalyst suspended in the liquid phase is also possible. The molar ratio of tetrahydrofuran to alkylene oxide is from 20:1 to 1:20. The concentration of the compound containing active hydrogen in the starting mixture is, for example, from 0.5 to 15 mol %.

According to the invention, the copolymers are subjected to a distillation at above 200° C., preferably from 210° to 250° C., under reduced pressure, preferably from 2 to 0.2 mbar.

Separating off the oligomeric cyclic ethers by distillation can be carried out in practice using a conventional reduced pressure distillation apparatus. For example, distillation can be carried out batchwise from a batch distillation apparatus, without rectification. Short-path distillation apparatuses, eg. conventional film evaporators with mechanical surface distribution or automatic distribution, are advantageous. In the case of the film evaporators, the continuous procedure is generally preferred, whereas distillation from a batch distillation apparatus is carried out batchwise in most cases. Flash evaporators are also suitable for separating off the oligomeric cyclic ethers. In these apparatuses, the required evaporation energy is introduced into the product in the form of sensible heat, after which the product is let down into a suitable vessel under reduced pressure. During this procedure, the cyclic oligomeric ethers present therein are vaporized. The distillation can be reinforced by additional stripping with an inert gas, such as nitrogen or superheated steam.

The residence time of the copolymers at the distillation temperature can be from 0.05 to 5, preferably from 0.1 to 2, hours.

In a preferred embodiment of the novel process, the copolymers are treated with oxygen or an oxygen-containing gas at from 20° to 110° C. before being subjected to a distillation under reduced pressure. In this treatment, about 1–8, preferably 2–4, parts by weight of oxygen are used per 1,000 parts by weight of polymer.

Using the novel process, the undesirable oligomeric cyclic ethers can be virtually completely distilled off from the copolymers, which usually contain about 10–20% by weight of the said ethers, in a particularly simple manner, without the copolymeric glycols undergoing thermal degradation. This advantageous result was not expected, since polytetrahydrofuran and polytetrahydrofuran copolymers are considered to be thermally unstable and very sensitive to oxidation. Thus, the thermal degradation of polytetrahydrofuran at various temperatures is described in, for example, Die Makromolekulare Chemie, 81 (1965), 38–50. The polymers used have been obtained by polymerization either in the presence of atmospheric oxygen or under reduced pressure. Both polymers underwent degradation at above 150° C. When the polymers were subjected to thermal treatment in the presence of air, they underwent complete decomposition. Commercial polytetramethylene ether glycols, too, decompose at above 210° C. If, in accordance with British Pat. No. 854,958, an attempt is made to remove the oligomeric cyclic ethers by distillation under reduced pressure at below 200° C., substantially poorer results are obtained (cf. Comparative Example 2).

The copolymers obtainable by the novel process, in particular those having a molecular weight of from 500 to 5,000, are outstandingly suitable for the preparation of polyurethanes or polyesters. They give ready-prepared polymers which possess good mechanical properties coupled with good low-temperature strength and resistance to microbes and to hydrolysis.

The Examples which follow illustrate the process according to the invention without restricting it. Parts are by weight, and parts by weight bear the same relation to parts by volume as that of the kilogram to the liter.

EXAMPLE 1

Commercially available technical-grade tetrahydrofuran was purified according to Example 1 of European Laid-Open Application No. 3,112, and used for the copolymerization.

Bleaching earth obtainable commercially under the name ®Tonsil Optimum FF from Süd-Chemie AG, Munich, was converted to extrudates having a diameter of from 2 to 3 mm and a mean length of 4 mm, and the extrudates were dried for 4 hours at 200° C.

250 parts by volume of the bleaching earth extrudates were introduced into a thermostatted stirred vessel having a capacity of 1,000 parts by volume. 700 parts by volume of a solution consisting of 73 parts of tetrahydrofuran, 20 parts of propylene oxide and 7 parts of butane-1,4-diol were then added, while stirring, and the temperature was then brought to 30° C. for 25 hours with the aid of a thermostat, stirring being continued. The polymer solution was then separated from the catalyst by filtration. The resulting product consisted of 44% by weight of tetrahydrofuran and 56% by weight of a tetrahydrofuran/propylene oxide copolymer which contained about 35–40% by weight of oxypropyl groups. The polyetherglycol had a molecular weight of 1,200, calculated from the hydroxyl number. During the polymerization, propylene oxide and butane-1,4-diol were completely converted.

The copolymer, which had been completely freed from residual monomers, was then treated with air at 80° C., 5 parts by volume of air being used per 1,000 parts of the polymer and the air being passed in from a frit. The volatile oligomeric cyclic ethers were then distilled off by evaporation under reduced pressure in a rotary film evaporator at 220° C. and under 2 mbar. The amount distilled was 7% by weight, based on the copolymer used. The distillate consisted of 80% of oligomeric cyclic ethers whose rings contained from 1 to 3 oxypropyl or oxybutyl groups. The copolymer leaving the rotary film evaporator proved to be outstandingly suitable for the preparation of polyesters or polyurethanes possessing good mechanical properties.

A similar result was obtained when, instead of propylene oxide, an equivalent amount of ethylene oxide was used for the copolymerization.

EXAMPLE 2 (COMPARATIVE EXAMPLE)

The copolymer obtained as described in Example 1, and completely freed from residual monomers, was subjected to distillation at 180° C. and under a reduced pressure of 2 mbar in a rotary evaporator. The amount distilled was 2.6% by weight.

The copolymer purified in this manner was converted to casting elastomers in a conventional manner, by reaction with 2,4-toluene diisocyanate and butanediol. This gave moldings whose surface exhibited an oily film which constantly reappeared some time after being removed with a solvent.

In moldings which were prepared in a similar manner using the copolymer obtained as described in Example 1, exudation of an oily film at the surface was not observed.

I claim:

1. In a process for reducing the content of oligomeric cyclic ethers in a polyoxybutylene polyoxyalkylene glycol wherein a copolymer, obtained by copolymerization of tetrahydrofuran with a 1,2-alkylene oxide in the presence of a compound containing reactive hydrogen under the catalytic action of a bleaching earth, is subjected to distillation at an elevated temperature and under reduced pressure, the improvement which comprises:

treating the copolymer, prior to said distillation, with oxygen or an oxygen-containing gas at a temperature of from 20° to 110° C.; and then carrying out the distillation under reduced pressure at a temperature above 200° C.

2. A process as claimed in claim 1, wherein the copolymer is treated, prior to said distillation under reduced pressure, with air as the oxygen-containing gas.

3. A process as claimed in claim 1, wherein the copolymer is treated with about 1 to 8 parts by weight of oxygen per 1,000 parts by weight of polymer.

4. A process as claimed in claim 1, wherein the copolymer is treated with about 2 to 4 parts by weight of oxygen per 1,000 parts by weight of polymer.

5. A process as claimed in claim 1, wherein the distillation under reduced pressure is carried out at from 210° to 250° C.

6. A process as claimed in claim 1, wherein the copolymer subjected to distillation under reduced pressure is one which is obtained by copolymerization of tetrahydrofuran with a 1,2-alkylene oxide in the presence of a compound containing reactive hydrogen and under the catalytic action of a bleaching earth, the molar ratio of tetrahydrofuran to the alkylene oxide being from 20:1 to 1:20, and the concentration of the compound containing reactive hydrogen being from 0.5 to 15 mol %.

7. A process as claimed in claim 1, wherein, in the preparation of the copolymer, ethylene oxide, 1,2-propylene oxide, 1,2-butylene oxide, 2,3-butylene oxide, styrene oxide or epichlorohydrin is used as the 1,2-alkylene oxide, and water, a monohydric or polyhydric alcohol or a carboxylic acid of 1 to 8 carbon atoms is used as the compound containing reactive hydrogen.

* * * * *